March 15, 1966 | P. H. BARDELL, JR | 3,241,122

ASYNCHRONOUS DATA PROCESSING CIRCUITS

Filed July 7, 1961 | 3 Sheets-Sheet 1

| OPERATING CONDITION | SET INPUT | RESET INPUT | INTERNAL OUTPUT | EXTERNAL OUTPUT |
|---|---|---|---|---|
| 1 | 1 | N | 1,0,N | 1,0,1 |
| 2 | 1 | 0,1 | 1,0,N | N |
| 3 | 0 | N | 1,0,N | 0,0,0 |
| 4 | 0 | 0,1 | 1,0,N | N |
| 5 | N | N | 1,0,N | 1,0,N |
| 6 | N | 0,1 | 1,0,N | N |

| INFORMATION STATE | INTERNAL CODE | EXTERNAL CODE |
|---|---|---|
| 1 | GROUND | +V |
| N | -V | GROUND |
| 0 | +V | -V |

INVENTOR
PAUL H. BARDELL JR.

BY Wesley De Bruin

ATTORNEY

ASYNCHRONOUS DATA PROCESSING CIRCUITS
Filed July 7, 1961 3 Sheets-Sheet 2
FIG. 4
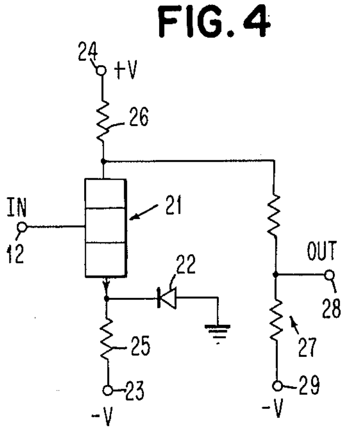
FIG. 5
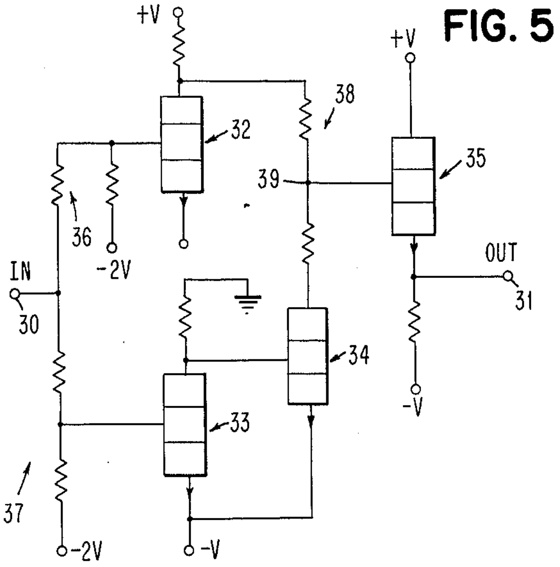
FIG. 6
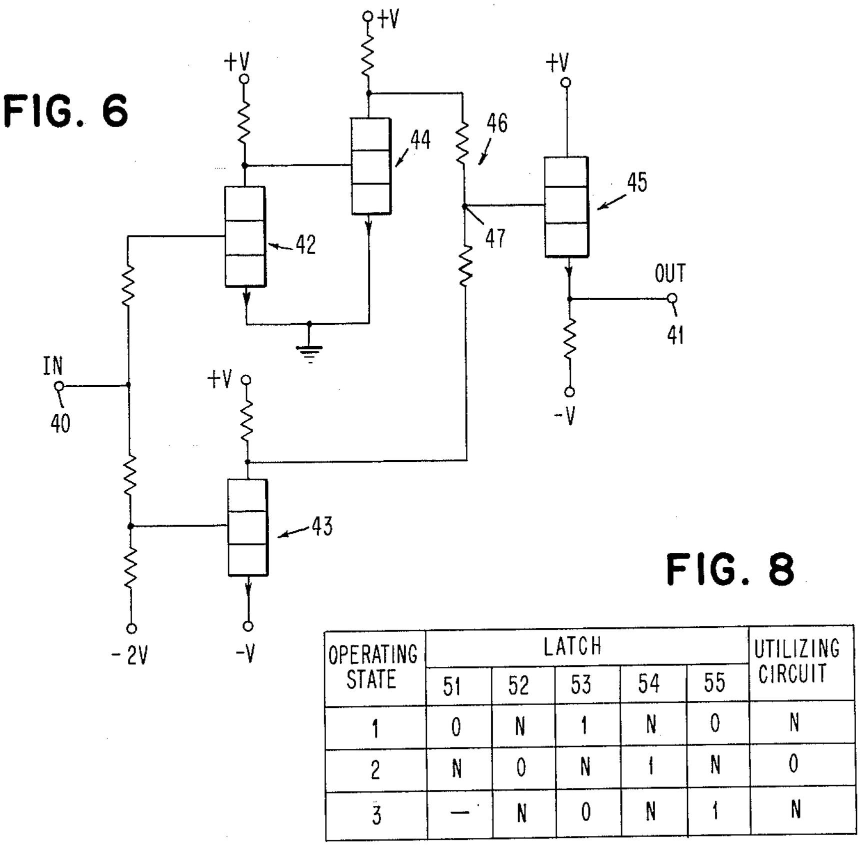
FIG. 8
| OPERATING STATE | LATCH | | | | | UTILIZING CIRCUIT |
|---|---|---|---|---|---|---|
| | 51 | 52 | 53 | 54 | 55 | |
| 1 | 0 | N | 1 | N | 0 | N |
| 2 | N | 0 | N | 1 | N | 0 |
| 3 | — | N | 0 | N | 1 | N |

March 15, 1966 P. H. BARDELL, JR 3,241,122

ASYNCHRONOUS DATA PROCESSING CIRCUITS

Filed July 7, 1961 3 Sheets-Sheet 3

United States Patent Office 3,241,122

Patented Mar. 15, 1966

3,241,122
ASYNCHRONOUS DATA PROCESSING CIRCUITS

Paul H. Bardell, Jr., Poughkeepsie, N.Y., assignor to International Business Machines Corporation, New York, N.Y., a corporation of New York Filed July 7, 1961, Ser. No. 122,561
10 Claims. (Cl. 340—172.5)

This invention relates to sequentially operable logic circuitry for processing ternary coded information in an asynchronous manner and, more particularly, to the provision within such circuitry for obtaining information correspondence with combinatorial logic circuitry.

In modern digital computers, a binary connotation is usually given to the state of data, with binary "1" denoting the presence of information and binary "0" indicating the absence of information. Since the latter manifestation, as used in asynchronously operable machines, may also reflect control data, such as timing information, an ambiguity exists in the coding scheme and, as a result, the versatility of such machines is limited.

Consequently, an information coding scheme has recently been proposed, whereby the logic capabilities of asynchronously operable computers can be substantially extended. This scheme provides for the use of circuits responsive to ternary coded information. The binary states of "1" and "0" are used as data states and are referenced about a third state, for example "nothing," which usually has a voltage level intermediate the two information states. The implementation of this scheme has been described in relation to combinatorial forcing circuits and extended to sequentially operable circuits in the copending application Serial No. 27,235, filed April 14, 1960, now Pat. No. 3,005,112, and assigned to the same assignee.

When ternary information coding is employed in a synchronously operable system, this third state can be an information bearing state indicative of the presence or absence of data. Thus, an arrangement operating in this manner would be a true ternary data processing system. Of more practical significance is the use of such a scheme by adapting it for use in a system employing binary coding of the data. In this type of system the third state carries timing information permitting asynchronous system operation, thereby eliminating the problems of synchronously operable circuits.

Synchronous logic circuits are beset by skew problems. In order to compensate and minimize for them, elaborate gating arrangements, employing additional components and circuitry, must be included in the system. Since asynchronous logic circuits, operable in response to ternary coded information, carry their own timing signals, i.e., each operation in such a system is initiated by a signal from the preceding operation, they eliminate any problems of skew as well as these additional components and circuits.

In addition, asynchronous circuitry has the additional advantage over synchronous circuitry (when considered on a system basis) of operating at substantially greater speeds, even though there is no time advantage achieved on a block by block basis. Asynchronous circuitry has the further advantage of indicating malfunctions substantially at the time of occurrence since a logical operation can be continued in such circuitry only as long as it can operate correctly on the information being supplied. A further feature of ternary code responsive asynchronous circuitry is that it requires only a single wiring system as opposed to the double wiring system required for other types of asynchronous circuits.

Although these and other advantages of ternary code responsive asynchronous circuits are obvious to one skilled in this art, a problem of correspondence arises when such circuits are used sequentially in conjunction with combinatorial circuits.

One of the normal ternary coding schemes provides for the information states, binary "1" and binary "0," to be placed symmetrically about a "nothing" information state. Whereas the binary "1" and binary "0" states carry data, the third or "nothing" information state controls the timing of the circuit operation. Consequently, it should be separable from the data bearing states in sequentially operating circuits in order that it may be clipped to determine the presence or absence of data, in a manner analogous to the determination of the presence or absence of control signals in conventional binary combinatorial circuits. This separateness of the third information state is neither necessary nor desired in ternary coded asynchronous combinatorial circuitry. As a result, at any interface between a sequential circuit and a combinatorial circuit, it is necessary to translate the information into the code which is most optimum for that type of circuit.

Accordingly, it is a primary object of the invention to provide sequentially operating asynchronous logic circuits responsive to ternary coded information and adapted for coupling to interfaced combinatorial logic circuits, by optimizing the information coding scheme for each type of circuit.

It is another object of the invention to provide such circuits with provision for translating the coding scheme employed in the sequential logic circuits, thereby enabling the information to be processed in combinatorial logic circuits.

A further object of the invention is to provide a logical system operable in the binary mode and including a third state for controlling the timing of sequential logic circuits and having provision for changing the coding of the information when coupling from or to a combinatorial logic circuit, so that coding optimization is provided for both types of circuits.

A more specific object of the invention is to provide a shift register operable in response to ternary coded information and having provision for providing parallel and/or series output signals whose logical coding is adapted for use in either combinatorial or other sequential logic circuits.

A further specific object of the invention is to provide a latch operable in response to ternary coded information and having provision for providing output signals coded for use in either combinatorial or sequential logic circuits.

In accordance with an aspect of the invention, there is provided a logic circuit for sequentially processing ternary coded information and restoring signals codified according to a first coding scheme to produce at least one output signal. The output signal is coded according to a second coding scheme and capable of correspondence with a second logic circuit for combinatorial processing. The sequential circuit comprises means for combining the information and restoring signals dependent on the previous state of circuit operation, thereby producing a combined signal which is cycled for coding correspondence with the second logic circuit. Means are also provided for recycling the combined signal so as to control the next state of circuit operation. In this manner, the coding of the ternary coded signals is optimized for both the sequential and combinatorial logic circuits.

The foregoing and other objects, features and advantages of the invention will be apparent from the following more particular description of a preferred embodiment of the invention as illustrated in the accompanying drawing wherein:

FIG. 4 is a schematic diagram of a possible implementation of the information detector of the latch circuit of FIG. 2;

FIG. 5 is a possible implementation of the up-shift translator of the latch circuit of FIG. 2;

FIG. 6 is a possible implementation of the down-shift translator of the latch circuit of FIG. 2;

FIG. 8 is a table showing the information states of the various latch circuits of the shift register of FIG. 7 when in several operating states.

As previously mentioned, one state of information is employed in ternary code responsive asynchronous logic circuits for timing control. One form of ternary coding scheme provides for the data bearing states of "1" and "0" to be placed symmetrically about a no data intermediate state, indicated as a "nothing" ("N") information state, the "N" state being employed to carry the timing information. Although such a scheme is desired for combinatorial logic circuits, it is necessary that the data states be separated from the "N" state in sequential circuits so that either the "1" or "0" state is capable of overriding the "N" state, permitting the voltage level of the "N" state to be clipped, if necessary, without losing data. Consequently, in sequentially operable circuits the information is coded so that the "N" state is at the most negative level.

Figures 1, 2, 3:
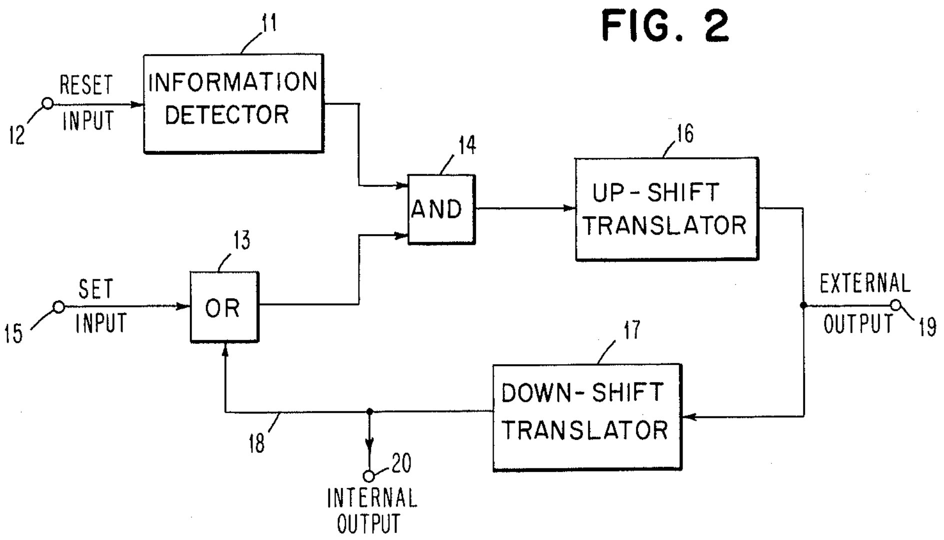
FIG. 1 is a table presenting the voltage levels for the three information states employed in the two coding schemes according to the principles of the invention.
FIG. 2 is a block diagram of a latch circuit embodying the principles of the invention and adapted to be coupled at its respective outputs to sequential and combinatorial logic circuits.
FIG. 3 is a table giving the logic states for the internal and external output signals according to the various operating conditions for the circuit of FIG. 2.

Referring now to FIG. 1, the comparable voltage levels of the two coding schemes for the information states of "1," "N" and "0" are indicated in tabular form. The code designated as internal refers to that employed in a sequential circuit or when coupling from one sequential circuit to another, whereas, the external code is utilized in combinatorial type circuits or when coupling from a sequential to a combinatorial circuit. In the internal code, it is obvious that the "1" and "0" states are both more positive than the "N" state (−V). In the external code, the "1" and "0" states are placed symmetrically about the "N" state (ground). It should be readily apparent, of course, that the voltage levels indicated have been chosen merely by way of illustration and comparable voltage levels also could be employed. For purposes of consistency, however, the designations made will be followed throughout the description of the invention.

A latch, as ordinarily defined and understood, is a sequentially operating circuit receiving two input signals and depending on its previous state of operation for producing at least a single output signal. When responsive to ternary coded information, it has three stable states. Moreover, it includes a combinatorial logic portion for accepting the input signals and the information relative to the previous operating state; a gain producing portion, and a loop for feeding the output signal back to the combinatorial portion permitting the circuit to be gated.

Referring to FIG. 2, the combinatorial portion of a latch embodying the principles of the invention comprises an information detector 11 for receiving a reset input signal at a terminal 12 and conventional diode OR and AND gates 13–14, respectively. The gate 13 is coupled to terminal 15 for receiving a set input signal. The gain producing portion of the circuit includes up-shift and down-shift translators 16–17, respectively; the translator 17 being connected in a feedback loop 18 coupling a circuit output terminal 19 to the OR gate 13. As shown, the output signal provided at terminal 19 is referred to as the external output, i.e., the information state is determined by the level of the voltage according to the external code scheme of FIG. 1. This output signal may be coupled, therefore, to a combinatorial logic circuit. Additionally, a second output signal referred to as an internal output is provided at a terminal 20, which is coupled to the loop 18. It is obvious that this output signal is synonymous with the previous state of circuit operation and is in the internal coding scheme, permitting it to be utilized in another sequentially operating circuit.

As shown in FIG. 4 the information detector is essentially a transistor inverter circuit which comprises the transistor 21 and a semi-conductor diode 22 which is connected between the emitter electrode of the transistor and ground potential. The emitter and collector electrodes of the transistor 21 are suitably biased through the resistors 25–26 by potentials applied at the terminals 23–24, respectively. The base electrode of the transistor 21 is coupled to the terminal 12 for receiving the reset input signal, and an output terminal 28 is connected to a voltage divider 27, between the collector electrode of the transistor 21 and a bias supply connected to terminal 29. The operation of the circuit is such that, when the input signal to the circuit is at the −V voltage level ("N" information state), the transistor is non-conductive and the circuit output is pulled to +V through the resistor 26 and the voltage divider 27. However, when the input signal is at ground or +V, i.e., when it is in a data state, the transistor is rendered conductive and the output at terminal 28 will be a −V. It will be more apparent from the description which follows hereinafter that the output signal of the information detector 11, overrides the set input signal or the previous state of circuit operation whenever it is at the −V voltage level.

The up-shift translator accepts an input signal in the internal coding scheme at a terminal 30 and provides an output signal in the external coding scheme at the terminal 31. The circuit comprises a plurality of transistors 32–35. The transistors 32–34 act as inverters and the transistor 35 is an emitter follower output stage. Each of the transistors is suitably biased so that the transistor 34 is normally conducting and the other transistors are normally non-conducting. The input to the transistors 32 and 33 is provided through equivalent voltage dividers 36–37.

In operation, when the voltage level at the input terminal 30 is +V, the transistors 32–33 are turned-on. Since the transistor 33 is conducting, it causes the transistor 34 to be rendered non-conducting. Thus, the voltage level across a voltage divider 38 at a node 39 is negative. The emitter follower 35 amplifies the current flow through impedance transformation enabling a negative ouput signal to be provided at terminal 31. If the input signal is at ground potential, transistors 32 and 34 are rendered conducting and transistor 33 is rendered non-conducting. The potential level at node 39 is positive enabling a positive signal level to be provided at terminal 31. If the input signal at terminal 30 is negative, the transistors 32–33 are maintained in a non-conducting state and the transistor 34 continues to be conductive. The output signal is at ground potential due to the voltage balance that is developed across the voltage divider 38.

The circuit of FIG. 6 is essentially the same circuit as that of FIG. 5 with appropriate changes made in the biasing circuitry, enabling it to act as a down-shift translator. The input which is applied at terminal 40 is in the external code and the output provided at terminal 41 is in the internal code. The circuit comprises transistor inverters 42, 43 and 44 and an emitter follower output stage 45 connected across a voltage divider 46 at a node 47. Appropriate biasing potentials are applied to each of the transistors so that the transistors 42–43 are normally non-conducting, transistor 44 is conducting and the transistor 45 is also non-conducting.

In operation, a positive signal level turns the transistors 42–43 on, causing transistor 44 to be made nonconductive so that the signal at node 47 is at ground potential due to the voltage balance developed across a voltage divider 46. The transistor 45 amplifies the current flow enabling a ground signal level to be provided as the output signal at terminal 41. When a ground signal level is introduced into the circuit, transistors 43–44 are rendered conducting and the transistor 42 nonconducting. Since transistor 44 is conducting, the voltage at node 47 is between ground and —V, so that a negative output signal is provided at terminal 41. Similarly, when a negative input is introduced into the circuit, the transistors 42–43 are kept in a non-conducting state, causing the transistor 44 to conduct, producing a positive output signal at terminal 41.

Having described the operation of the various component circuits of the circuit of FIG. 2, the logical operation of the latch may be readily ascertained by referring to the table of FIG. 3. By way of emphasis, however, it should be understood that the set and reset input signals and the internal output signal (corresponding to the previous state of circuit operation and the output signal provided at terminal 20 of FIG. 2) have voltage levels in accordance with the internal coding scheme of FIG. 1. Similarly, the external output signal (corresponding to the output signal provided at terminal 19 of FIG. 2) has a voltage level in accordance with the external coding scheme of FIG. 1.

If it is assumed, as in the operating conditions 1, 3, and 5, that the reset input signal is in the "N" state, i.e., it has a signal level of —V volts, then the output voltage level of the information detector 11 is +V. Under such circumstances, the AND gate 14 follows the output signal level of the OR gate 13. Gate 13 produces an output signal which is the more positive of the set input signal or the previous state of circuit operation. Therefore, by way of illustration, if the set input is in the "1" information state (ground voltage level) and the previous state of circuit operation is in the "N" information state (—V voltage level), then the output signal level of gate 13 is ground (as shown for operating condition 1). When this signal level is ANDed with the +V signal provided by the information detector 11, the AND gate 14 provides a ground output signal level which again corresponds to the "1" information state. This signal level is converted by the up-shift translator 16 so that the external output of the circuit at terminal 19 is +V corresponding to the "1" information state of the external coding scheme.

This signal is also coupled back to the OR gate 13 through the feedback loop 18. The down-shift translator converts the +V output signal to a ground signal level which corresponds to the "1" information state of the internal coding scheme. This signal level is also provided as the internal circuit output at terminal 20.

By way of further illustration (refer to operating condition 3), if the set input signal is in the "0" information state (+V voltage level) and the previous state of circuit operation is in the "1" information state (ground voltage level), then OR gate 13 provides a +V voltage level at its output. When ANDed with the +V level provided by the information detector 11, AND gate 14 provides a +V signal level at its output which corresponds to the "0" information state of the internal coding scheme. The translator 16 converts the level of the signal to a —V voltage level corresponding to the "0" information state of the external coding scheme. This level is provided as the circuit output at terminal 19. The translator 17 operates in the manner previously described by converting the —V signal level back to a +V signal level to provide the internal output of the circuit at terminal 20, as well as to gate the OR circuit 13 with the previous state of the circuit operation. Thereafter, if the set input signal goes to the "N" state (—V voltage level), as in operating condition 5, the circuit continues to be latched according to the previous state of circuit operation.

In like manner, the logical operations which follow from the other combinations of signal levels for operating conditions 1, 3 and 5 may also be followed through the circuit. In each case, the AND gate 14 follows the output of the OR gate 13 which depends, in turn, on the more positive level of the set input signal or the previous state of circuit operation.

However, when the reset input signal is in either the "0" or "1" information states, i.e., it is at one of the more positive signals levels, ground or +V, as in the operating conditions 2, 4 and 6, then the information detector 11 provides a signal level of —V at its output and the AND circuit 14 follows this signal level regardless of the level of the set input signal or the level of the previous state of circuit operation. Under such circumstances, the AND circuit 14 always provides a —V signal level at its output corresponding to the "N" information state of the internal coding scheme. When converted by translator 16, this signal level becomes the ground signal level of the external coding scheme which is intermediate the signal levels for the "1" and "0" information states. The down-shift translator 17 operates in the manner already described to convert the signal level back to the internal coding scheme in order to facilitate the gating of the latch.

It is obvious, of course, that the circuit of FIG. 2 accomplishes the features of the invention by optimizing the coding scheme of the ternary coded information for asynchronous circuit operation. The coding of the voltage levels for the information employed within the latch or provided at the terminal 20 for coupling to another sequential circuit readily separates the "N" information state or timing information so that it may be clipped. Simultaneously, the circuit adapts these voltage levels for the external coding scheme, enabling the external output from the circuit at terminal 19 to be employed in combinatorial logic circuits by symmetrically placing the information states of "1" and "0" about the "N" state.

Figure 7:
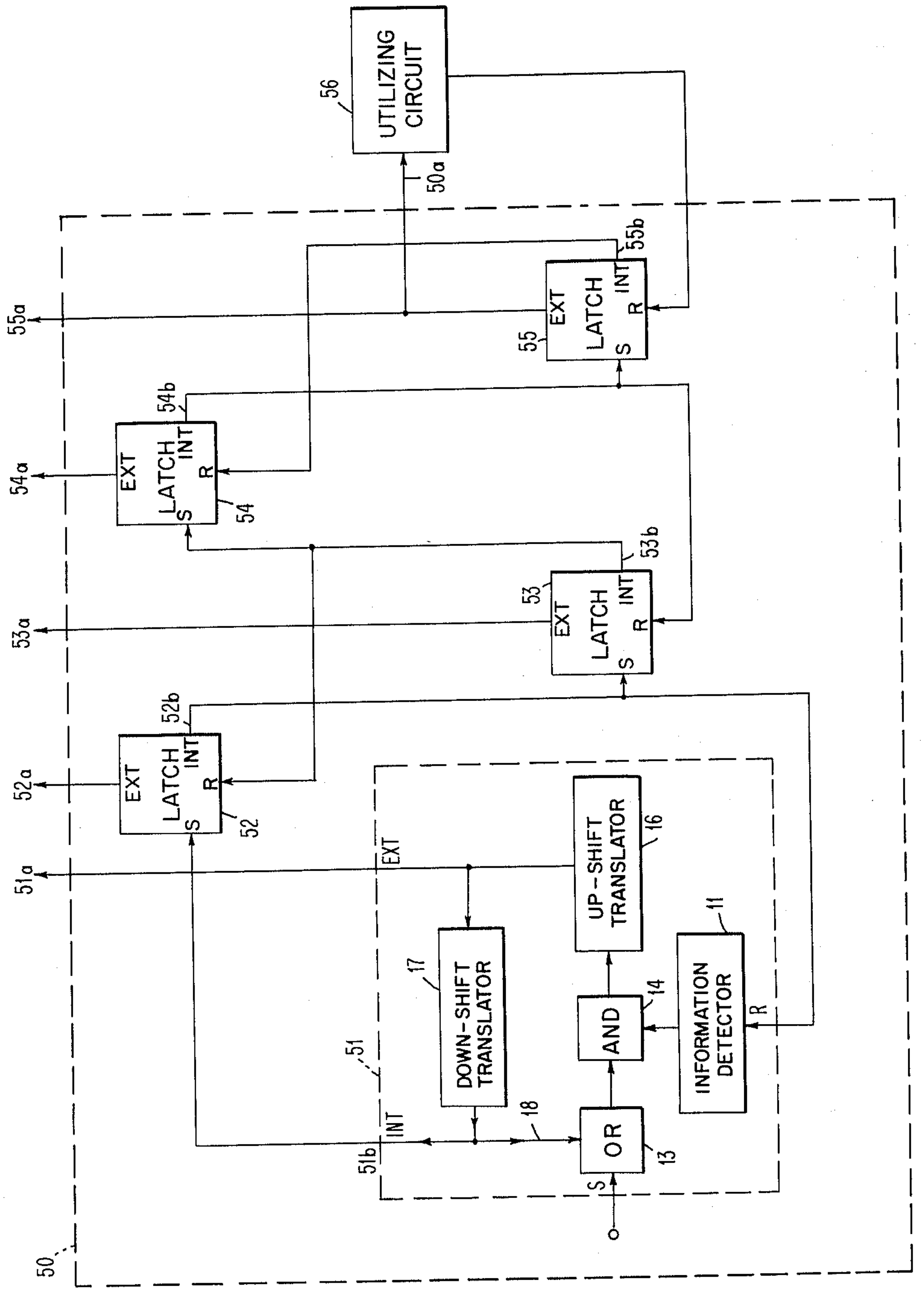
FIG. 7 is a block diagram of a shift register employing a plurality of the latch circuits as shown in FIG. 2 and adapted to provide output signals capable of being processed in either combinatorial or other sequential logic circuits.

The features of the invention may also be applied to other types of sequential circuits, for example, a shift register 50 is shown in FIG. 7 as comprising a plurality of latch circuits 51–55. As shown for the latch 51, each circuit is the same as the circuit of FIG. 2, having a combinatorial logic portion including an information detector 11 for receiving a reset input signal (R) and OR and AND gates 13–14. The OR gate accepts a set input signal (S). The gain producing portion includes the up and down shift translating circuits 16–17; the down-shift translator being connected in a feedback loop 18 to provide a signal for gating the OR circuit 13. Each of the latch circuits provides an external output *51a–55a*, which has a signal level in the external coding scheme. These outputs are parallel outputs from the shift register 50. The last stage 55 of the shift register 50 may also provide a series output *50a*, which is also in the external coding scheme. As shown, this output signal may be coupled to a utilizing circuit 56 of the combinatorial logic type.

Each of the latch circuits 51–55 also provides an internal output signal *51b–55b*. These output signals are employed within the shift register 50 or they may be coupled to another sequential circuit. Each of the internal output signals accomplishes a dual function by providing the set input signal to the next succeeding latch stage, as well as the reset input signal to the next preceding stage. In this manner, when information is stored in various stages of the shift register, a given stage will retain the information stored in it until it is reset by the internal output signal from the next succeeding stage.

In operation, if it is assumed that the stages of the shift register are in the information states indicated for operating condition 1 of FIG. 8 and it is desired to shift the stored information from stage to stage, then the last latch stage 55 must first be reset. This may be accomplished by feeding a signal back from the utilizing circuit 56; it being understood that this signal may have to be converted to the internal coding scheme of the shift register. When latch 55 is in an information state and the signal presented to its reset input is in the "N" state (operating state 1), it provides an output signal at 55*b* which is employed to keep latch 54 in a reset condition preventing the data from latch 53 from entering latch 54 at the set input. When the information in stage 55 is accepted by the utilizing circuit, a signal in an information code ("1" or "0") will be received at the rest input of latch 55. This will cause the internal state of stage 55 to change to "N" (reset condition). Output 55*b* is now "N" which no longer holds latch 54 in the reset condition. The information in latch 53 is now transferred to latch 54. When latch 54 is set, output 54*b* resets stage 53, and is also present at the set input of latch 55. As long as the utilizing circuit presents an information state at the reset input of stage 55, the information in 54 will not transfer to stage 55. Since output 54*b* resets latch 53, information transfers from latch 51 to latch 52 in like manner. Indeed, the transfer will propagate the length of the shift register until the information resides in the upper rank of latches and all of the lower ones are in the "N" state, as shown for operating state 2. When the reset input of latch 55 returns to "N" the information in stage 54 transfers to latch 55. Output 55*b* resets latch 54 allowing information to transfer from 52 to 53. The shift will propagate to the end of the register. When complete, the information will reside in the lower rank of latches (refer to operating state 3), shifted one position from its initial place. It is not necessary to wait for the completion of the first half shift (lower rank to upper) before initiating the second half shift (upper to lower). It is only necessary that the reset pulse from the utilizing circuit be long enough to reset latch 55.

It should be obvious that the reset input signal for latch stage 55 may be provided by other circuit means, the arrangement that has been described being chosen merely by way of example.

While the invention has been particularly shown and described with reference to preferred embodiments thereof, it will be understood by those skilled in the art that various changes in form and details may be made therein without departing from the spirit or scope of the invention. For example, the principles of the invention are equally applicable for use in counter circuits, ring circuits, or other types of circuits which employ latches for storing information.

What is claimed is:

1. A sequentially operated circuit capable of accepting information and restoring signals and depending on its previous state of operation, each signal residing in a first, second or third voltage level of a first coding scheme, and for providing an output signal adaptable for use in a combinatorial circuit in corresponding voltage levels of a second coding scheme, comprising an input circuit for accepting said input signals, means for combining said information and restoring signals, cycling means coupled to said combining means for changing the output of said combining means from said first coding scheme to said second coding scheme, said cycling means producing said output signal, means coupled to said cycling means for recycling said output signal back to said first coding scheme and feeding said recycled signal to said combining means, said recycled signal being indicative of the previous state of operation of said circuit.

2. The circuit of claim 1, and further comprising means for deriving a second output signal in said first coding scheme from said circuit.

3. A latch for accepting set and reset input signals, each signal residing in a first, second or third voltage level of a first coding scheme and for providing an output signal in corresponding voltage levels of a second coding scheme, comprising a first input circuit for accepting said reset signal; a second input circuit, including a first gate circuit for accepting said set signal; an output circuit for deriving said output signal from the latch; means coupling said input circuits and said output circuit, including a second gate circuit for producing a signal in accordance with the output of said first gate circuit when said reset signal is at the first voltage level of said first coding scheme and for producing a signal in accordance with the output of said first input circuit when said reset signal is in the second and third levels of said first coding scheme, and means for changing the output signal of said second gate circuit from said first coding scheme to said second coding scheme; and means for latching said second input circuit with the previous state of operation, including means for changing a signal from said second coding scheme to said first coding scheme.

4. A latch for accepting set and reset input signals, each signal residing in a first, second or third voltage level of a first coding scheme and for providing an output signal in related voltage levels of a second coding scheme, comprising means for combining said input signals and a signal indicative of the previous state of latching to produce a combined signal in accordance with said set signal and the latching signal when said reset signal is in the first level of said first coding scheme and to produce a combined signal in accordance with said reset signal when said reset signal in the second and third levels of said first coding scheme, and first and second means, including feedback means, for translating said combined signal to produce said output signal in said second coding scheme and said latching signal in said first coding scheme, said output signal being derived from the first translating means and said latching signal being coupled by said feedback means to the combining means.

5. A latch responsive to ternary coded information of a first coding scheme and for producing a ternary coded output signal in a second coding scheme dependent on the previous state of operation of said latch, comprising means for combining information and restoring signals and a signal indicative of the previous state of said latch to produce a combined signal, said signals being in said first coding scheme, means for imparting gain to said combined signal, and feedback means for coupling said combined signal back to said combining means, said means for imparting gain to said combined signal being characterized by means for producing said output signal in said second coding scheme and said signal indicative of the previous state of said latch in said first coding scheme.

6. Sequentially operable apparatus for producing at least one output signal residing in a first, second or third voltage level of a first or second coding scheme for processing in sequential or combinatorial logical manner, respectively, with other information of like coding in response to information and restoring signals contained in a first, second or third level of said first coding scheme, comprising a plurality of sequentially operable circuits, each of which is capable of accepting said information and restoring signals and of producing at least one output signal, said second and third voltage levels of said first coding scheme being data bearing states and said first voltage level of said first coding scheme controlling the sequencing of said apparatus, each of said sequentially operable circuits being coupled to the next succeeding circuit as well as to the immediately preceding one, said coupling to the next succeeding circuit providing said information signal, whereby said information may be shifted from one circuit to the next succeeding circuit, and said coupling to the immediately preceding circuit providing the restoring signal to render it capable of receiving the information signal from the circuit immediately preceding it, so that each of said circuits is alternately in data bearing state and a non-data bearing state, each of said circuits including means for combining said information and restoring signals to produce a combined signal in accordance with the levels of said information and restoring signals, means for cycling said combined signal to change the signal from said first coding scheme to said second coding scheme, whereby an output signal may be derived for processing in said combinatorial logical manner and means for recycling said output signal, whereby the previous state of circuit operation is indicated to said combining means and an output signal may be derived for processing in said sequential logical manner.

7. The apparatus of claim 6, wherein the means for combining said information and restoring signals comprises a first input circuit, including a first gate circuit for accepting said set signal; an output circuit for deriving a signal in said second coding scheme; means coupling said input circuits and said output circuit, including a second gate circuit for producing said combined signal in accordance with the output of said first gate circuit when said restoring signal is at the first voltage level of said first coding scheme and for producing said combined signal in accordance with the output of said first gate circuit when said restoring signal is at the first voltage level of said first coding scheme and for producing said combined signal in accordance with the output of said first input circuit when said restoring signal is in the second and third levels of said first coding scheme, and means for changing the combined signal from said first coding scheme to said second coding scheme; and means for latching said second input circuit with the previous state of operation, including means for changing a signal from said second coding scheme to said first coding scheme.

8. In a computer having a plurality of shift registers, each of said registers being capable of providing a plurality of output signals ternary coded according to a second coding scheme in response to information and restoring signals ternary coded according to a first coding scheme, wherein each of said registers comprises a plurality of tristable latch circuits, each providing one of said output signals dependent on the previous state of circuit operation, said circuits being cascaded so that the first of said circuits receives the information signal and each of said circuits provides the information signal for the next succeeding circuit and so that the last of said circuits receives the restoring signal and each of said circuits provides the restoring signal for the next preceding circuit, each of said circuits including means for combining said information and restoring signals and a signal indicative of the previous state of circuit operation to produce a combined signal, means for imparting gain to said combined signal, and feedback means for coupling said combined signal back to the combining means, said means for imparting gain being characterized by first means for producing one of said output signals in said second coding scheme and second means for producing said signal indicative of the previous state of circuit operation in said first coding scheme.

9. A shift register capable of having a single series output and a plurality of parallel outputs for coupling to combinatorial logic systems comprising a plurality of latches each of which is capable of accepting information bearing and restoring signals residing in a first, second or third voltage level of a first coding scheme and for producing an output signal in corresponding voltage levels of a second coding scheme for combining with said combinatorial logic, the first of said latches receiving said information signal and the last of said latches the restoring signal, said latches being coupled together in cascade, so that each provides the information bearing signal for the next succeeding latch and each provides the restoring signal for the immediately preceding latch, each of said latches comprising means for combining said information signals and said restoring signals to produce said second output signal, means for cycling said signal to produce said output signal residing in said second coding scheme and means for recycling said first output signal back to said first coding scheme for gating said combining means to the previous state of said latch.

10. The shift register of claim 9 and further comprising means for providing a second output signal from each of said latches, said second output signals being codified in said first coding scheme for processing in a sequential logical manner.

References Cited by the Examiner

Publication: On the State Assignment Problem for Sequential Machines, II, by R. E. Stearns and J. Hartmanis, published by Research Information Section, General Electric Research Laboratory, Schenectady, N.Y., March 1961.

Pages 212–254, 1958, Humphrey, Switching Circuits, McGraw-Hill.

Pages 108–175, 275–325, 1951, Keister et al., The Design of Switching Circuits, D. Van Nostrand.

ROBERT C. BAILEY, *Primary Examiner.*

MALCOLM A. MORRISON, *Examiner.*